(12) United States Patent
Douglas

(10) Patent No.: US 6,711,902 B2
(45) Date of Patent: Mar. 30, 2004

(54) INTEGRATED CYCLE POWER SYSTEM AND METHOD

(76) Inventor: Richard E. Douglas, 4485 S. Springwood Dr. SW., Smyrna, GA (US) 30082

( * ) Notice: Subject to any disclaimer, the term of this patent is extended or adjusted under 35 U.S.C. 154(b) by 0 days.

(21) Appl. No.: 10/162,094

(22) Filed: Jun. 4, 2002

(65) Prior Publication Data

US 2003/0163993 A1 Sep. 4, 2003

Related U.S. Application Data

(60) Provisional application No. 60/295,611, filed on Jun. 4, 2001.

(51) Int. Cl.[7] ............................... F02C 1/04; F02C 7/10
(52) U.S. Cl. .......................... 60/772; 60/39.511; 165/4; 165/10
(58) Field of Search ............................ 165/4, 10, 271, 165/299; 60/772, 39.5, 39.511

(56) References Cited

U.S. PATENT DOCUMENTS

| | | | | |
|---|---|---|---|---|
| 5,083,425 A | * | 1/1992 | Hendriks et al. | ......... 60/39.183 |
| 5,121,600 A | * | 6/1992 | Sanders et al. | .......... 60/39.464 |
| 5,255,507 A | * | 10/1993 | Gounder | .................... 60/39.12 |
| 5,287,695 A | * | 2/1994 | Schneider | .................. 60/39.12 |
| 5,811,201 A | * | 9/1998 | Skowronski | .................. 429/17 |
| 5,934,065 A | * | 8/1999 | Bronicki et al. | ......... 60/39.181 |
| 6,125,625 A | * | 10/2000 | Lipinski et al. | ................ 60/801 |
| 6,170,251 B1 | * | 1/2001 | Skowronski et al. | ......... 60/783 |
| 6,351,935 B1 | * | 3/2002 | Bronicki et al. | ......... 60/39.182 |

* cited by examiner

Primary Examiner—Charles G. Freay
(74) Attorney, Agent, or Firm—Myers & Kaplan, LLC; Joel D. Myers; Ashish D. Patel

(57) ABSTRACT

An integrated-cycle power system and method, comprising thermal transfer assembly, recuperating heat exchanger assembly, heat integrator, thermal conduit assembly and gas turbine. The thermal transfer assembly receives heat emitted from the effluent of a heat source, wherein the heat is preferably in the form of high temperature gas. Within the thermal transfer assembly, the energy of the high temperature gas is transferred to a conductive medium carried within a thermal conduit assembly. Due to a thermal potential between the augmenting heat source effluent and the heat integrator, the augmenting heat-source energy is transferred to the heat integrator, wherein energy from a novel recuperating heat exchange assembly is integrated therewith and introduced into the combustion chamber of a gas turbine. The recuperating heat exchanger assembly receives exhaust heat from the gas turbine and recuperates this energy via the heat integrator back into the combustion chamber of the gas turbine.

28 Claims, 12 Drawing Sheets

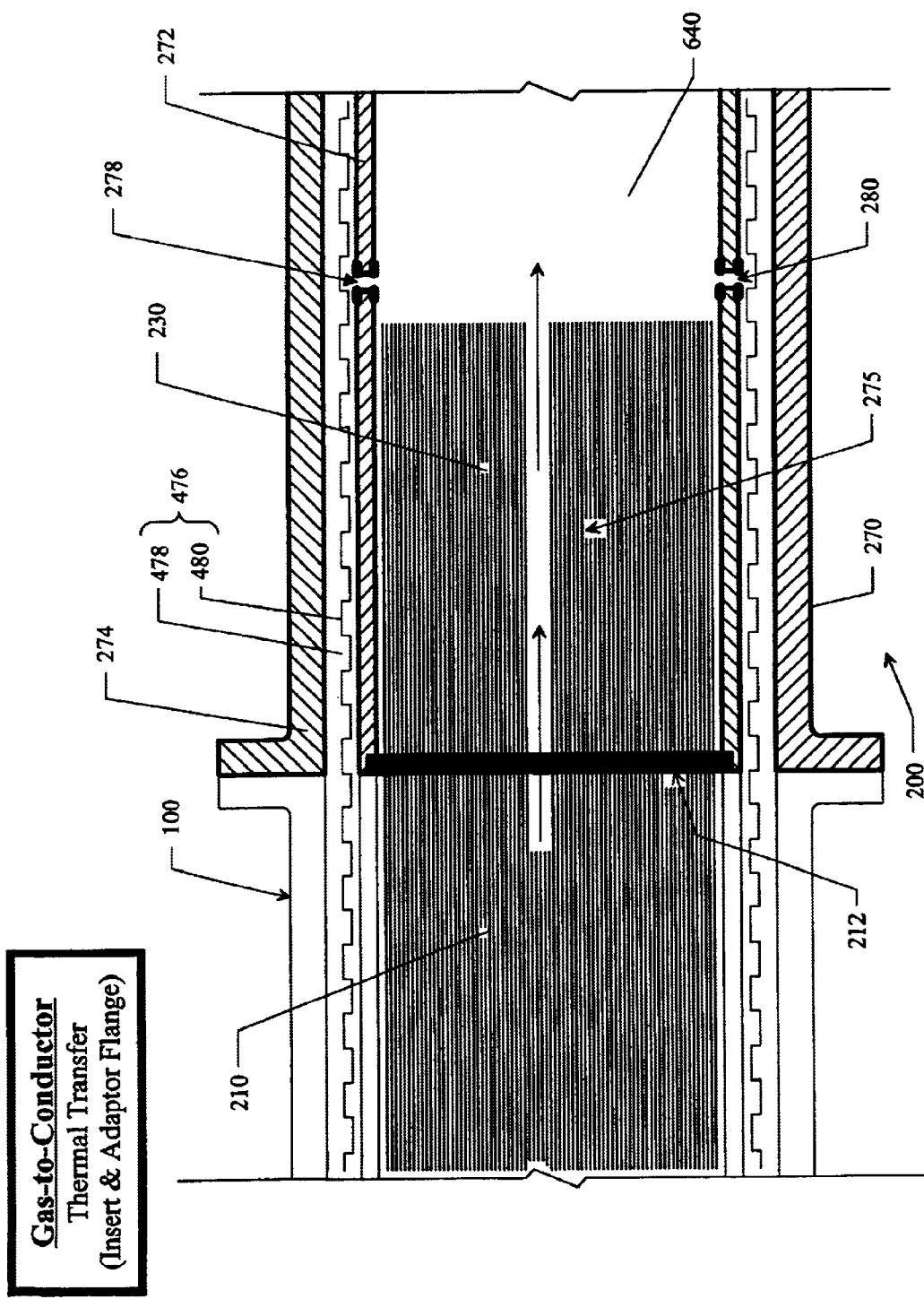

INTEGRATED CYCLE POWER SYSTEM AND METHOD

CROSS-REFERENCE TO RELATED APPLICATION

To the full extent permitted by law, the present application claims priority to and the benefit as a non-provisional application to provisional patent application entitled "Integrated Cycle Power System and Method" filed on Jun. 4, 2001, having assigned Ser. No. 60/295,611, wherein said application is incorporated herein by reference.

TECHNICAL FIELD

The present invention relates generally to power systems and, more specifically, to an integrated cycle power system and method for producing a power system having an elevated thermal efficiency curve throughout a broad band of power settings. The present invention is particularly useful in, although not strictly limited to, gas turbine electric power-generation systems such as utilized for ship powering and propulsion, and for utility power supply.

BACKGROUND OF THE INVENTION

Power systems are utilized in a multitude of applications, wherein power and/or converted electricity is needed. For instance, notwithstanding gravity, any moving object (i.e., vehicle, plane or ship) requires power to facilitate its movement. In addition, power systems are often utilized to convert mechanical energy into electrical energy, wherein this electrical energy is thereby utilized to power a proximal system or subsystem, or can be transferred via electrical power lines to provide electrical power for remote facilities such as homes and businesses.

Several types of power systems are known and widely used. For instance, internal combustion piston engines are typically used to power land vehicles, small machinery and some water craft. Turbines are typically utilized, however, for larger ships and utility power facilities because of the overall need for increased efficiency and large power demands.

A turbine is a device that converts enthalpy and kinetic energy of a moving fluid into some form of mechanical energy, which subsequently can be converted into electrical energy. A basic turbine generally consists of a series of rotors, wherein the rotors comprise a plurality of airfoil-shaped blades connected to a disk, wherein the disk is connected to shaft. The angle of attack, between the chord line of the blade-airfoil and the relative wind of the gas flow, generates a lift vector at the blade root, thereby causing the shaft to rotate. The rotating shaft can then be used to turn a generator to produce electrical current.

The most widely utilized turbine is the gas turbine. In a simple gas turbine cycle, low-pressure air is drawn into a compressor, wherein the air is compressed to a higher pressure. Fuel is then added to the compressed air followed by the mixture being burned in a combustion chamber. The resulting hot product from the combustion chamber enters a turbine and is expanded therethrough. The thermal efficiency of a gas turbine is equal to the net power output divided by the heat input. As such, to increase the thermal efficiency of a gas-turbine cycle the net power output must be increased and/or the heat input must be decreased per unit of power output.

Because of the enormous utilization and reliance on gas turbines for generating power, even the slightest improvement in its thermal efficiency can provide a substantial economic benefit. For instance, even a one percent increase in thermal efficiency can result in millions of dollars in energy savings per year for a single power plant. More specifically, based on the present average fuel cost, the cost to produce 100 MW of electric power for a typical power plant having a Rankine steam bottoming cycle and operating at 47% efficiency is approximately $4000 per hour for the fuel cost alone. This results in a cost per 24-hour period of approximately $96,000. Only a three percent increase in thermal efficiency for the production of 100 MW of power results in a fuel savings of approximately $8000 per 24-hour period, thus yielding approximately a $2,920,000 savings per year. It is widely known within the art that fuel costs are the largest expense for power plants, often amounting to greater than 70% of total operating and maintenance expenditures. These costs are typically passed on to the consumer.

Moreover, an overall plant operating efficiency of 47% is, traditionally, only achieved by coupling a Rankine steam bottoming cycle to the exhaust outlet of the base, simple-cycle gas turbine prime mover. The Rankine steam bottoming cycle, in a customary installation, will routinely occupy 10–15 times the volumetric expanse of the gas turbine and its immediate support equipment. This extreme space-and-mass profile renders such systems impractical for any type of mobile/impermanent application such as: ship, rail, barge, or limited duration fixed-base assignment. Because of the excessive amount of equipment and machinery that makes up a Rankine steam bottoming cycle, the costs of manufacture and operation-and-maintenance (O&M) are substantial. Generally stated, (1) the relatively low thermal efficiency of prior-art electric power generation systems results in overall high costs of acquisition and O&M expenditures, while (2) undue system size and mass foreclose product market applications beyond those of the traditional land-based power station.

Moreover, because of the worldwide energy crises and universal demand for more efficient power sources, prior-art power systems have proved to be disadvantageous, causing many to search for alternative energy sources such as solar, hydro and electrochemical. Although many of these types of energy sources are inexpensive, they fail to provide sufficient power for high-load, utility-level capacities, thereby rendering them uneconomic for all but the most modest of markets.

Consequently, it is readily apparent that there is a need for a thermally efficient power system and method that can provide energy for high-load applications at all power demand levels and that can operate at equal or higher thermal efficiency levels than prior-art systems without the need for arbitrarily complex combined-cycle thermal management strategies. It is to such an improvement that the present invention is directed.

BRIEF SUMMARY OF THE INVENTION

Briefly described, in a preferred embodiment, the present invention overcomes the above-mentioned disadvantages and meets the recognized need for such a device by providing a thermally efficient integrated-cycle power system and method, wherein the Rankine steam bottoming cycle of typical power plants is eliminated.

According to its major aspects and broadly stated the present invention in its preferred form is an integrated-cycle power system and method. More specifically, the present invention comprises a thermal transfer assembly, a recuperating heat exchanger assembly, a heat integrator, a thermal conduit assembly and a gas turbine. The thermal transfer assembly receives heat emitted from the effluent of a preferably external, independent augmenting heat source, such as a fuel cell, wherein the heat is preferably in the form of high temperature gas. Within the thermal transfer assembly, the energy of the high temperature gas is transferred to a conductive medium carried within a thermal conduit assembly. Due to a thermal potential between the augmenting heat source effluent and the heat integrator, the augmenting heat-source energy is transferred to the heat integrator, wherein energy from a novel recuperating heat exchange assembly is combined therewith and introduced into the combustion chamber of a gas turbine.

The recuperating heat exchanger assembly receives exhaust heat from the gas turbine and recuperates this energy via the heat integrator back into the combustion chamber of the gas turbine.

The novelty of the present invention lies not only in the overall system and method, but in many individual elements such as, for exemplary purposes only, the transfer media, the thermal conduit assembly, the heat integrator, the recuperating heat exchange assembly, the branch isolation assemblies and the facilities by which to integrate an independent augmenting power source such as a fuel cell, as is more fully described herein.

A feature and advantage of the present invention is to provide a power generating system having a high thermal efficiency without the excess space requirements of a Rankine steam bottoming cycle.

A feature and advantage of the present invention is its design system that enables the efficient engineering-adaptation of the invention to a broad power spectrum of existing simple-cycle turbine equipment.

A feature and advantage of the present invention is the design attribute, enabling the gas turbine designer to incorporate a thermal recuperation function, while maintaining/increasing performance-enhancing pressure ratios within the base machine.

A feature and advantage of the present invention occurs when the gas turbine designer increases performance-enhancing pressures within the base machine; the functional performance of the thermal recuperation function is, consequently, multiplied.

A feature and advantage of the present invention is its reduced costs of design, implementation, and in-service maintenance—vis-à-vis currently available art and practice.

A feature and advantage of the present invention is its capacity to configure the gas turbine engine so as to become the prime mover of choice; to functionally and economically displace current application of both the medium-speed and slow-speed diesel engine.

A feature and advantage of the present invention is its ability to eliminate the capital investment and maintenance fees associated with a Rankine steam bottoming cycle.

A feature and advantage of the present invention is to provide a power generating system and method that is substantially more efficient than a simple-cycle system or a conventional combined-cycle system, thus resulting in fuel cost savings and fuel conservation.

A feature and advantage of the present invention is its ability to provide a power generating system and method having a high operating efficiency maintained over a broad power band.

A feature and advantage of the present invention is to provide a power generating system and method that optimizes responses to both off-base and peak-load demands.

A feature and advantage of the present invention is to provide a power generating system and method that is relatively compact and easy to relocate.

A feature and advantage of the present invention is to provide a power generating system and method having the versatility to be utilized for both fixed-base (land) and/or mobile (marine, rail) applications.

A feature and advantage of the present invention is to provide a power generating system and method having a relatively low cost for maintenance.

A feature and advantage of the present invention is to provide a novel heat integrator and method.

A feature and advantage of the present invention is to provide a novel recuperating heat exchanger assembly and method.

A feature and advantage of the present invention is to provide a novel thermal conduit and thermal conduit assembly and method.

A feature and advantage of the present invention is to provide a novel heat isolation valve and method.

A feature and advantage of the present invention is to provide a novel thermal transfer assembly and method.

A feature and advantage of the present invention is to provide a novel conductive foam matrix and conductive-foam-matrix thermal transition apparatus and method.

A feature and advantage of the present invention is to provide a turbine-powered system capable of having a higher pressure ratio as compared to prior-art systems, wherein the pressure ratio for the present invention could be equal to or greater than 50.

These and other objects, features and advantages of the invention will become more apparent to one skilled in the art from the following descriptions and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 3 is a sectional view taken along lines 3—3 of FIG. 1A of an integrated cycle fuel cell/gas turbine apparatus according to a preferred embodiment of the present invention showing the gas-to-conductor thermal transfer subassembly.

DETAILED DESCRIPTION OF THE PREFERRED AND ALTERNATE EMBODIMENTS

Figure 1:
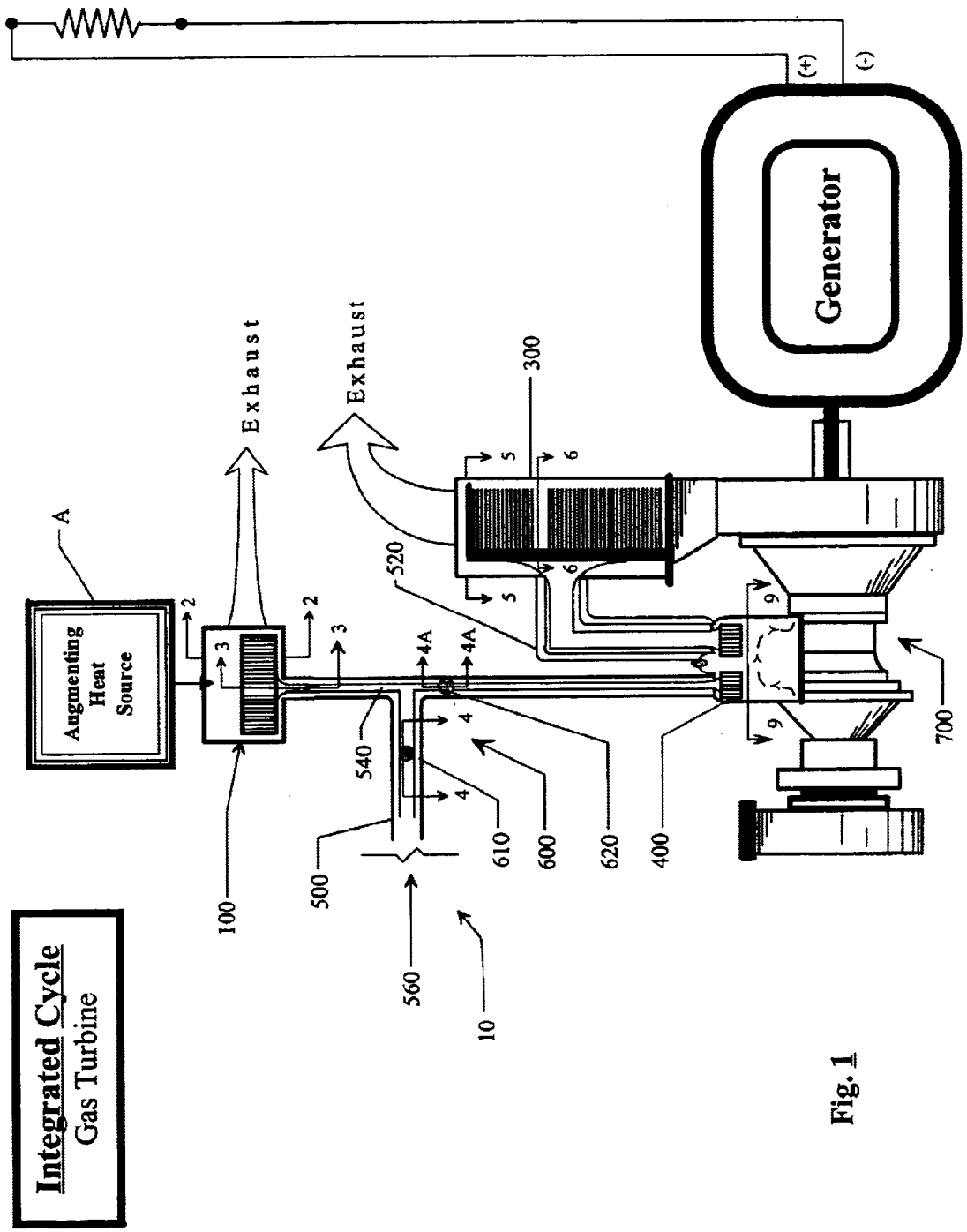
FIG. 1 is a diagram of an integrated cycle fuel cell/gas turbine apparatus according to an embodiment of the present invention.
Figure 1A:
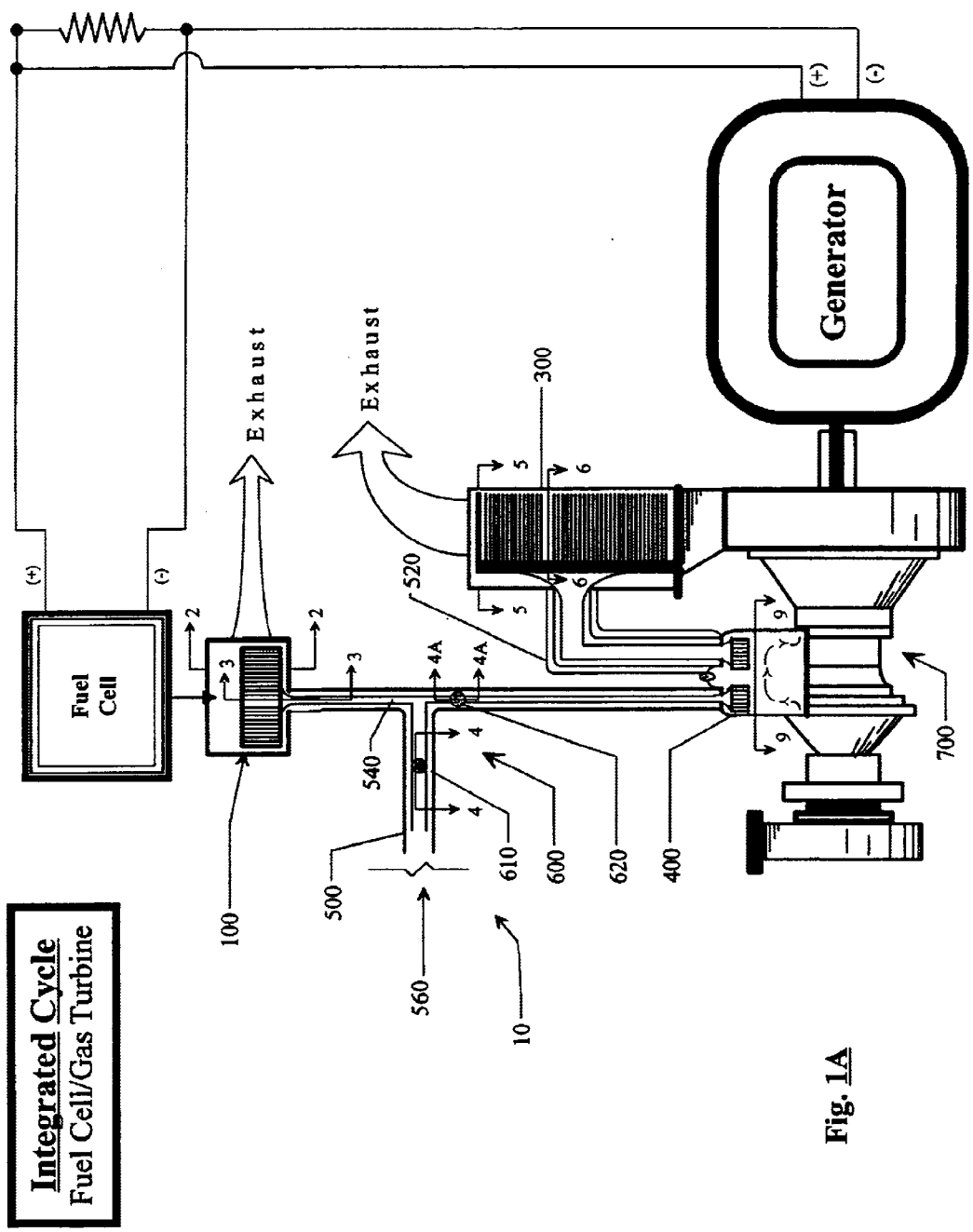
FIG. 1A is a diagram of an integrated cycle fuel cell/gas turbine apparatus according to a preferred embodiment of the present invention.

Referring now to FIG. 1, the present invention is an apparatus 10, wherein apparatus 10 is an integrated cycle fuel cell/gas turbine. Apparatus 10 generally comprises a thermal transfer assembly 100, recuperating heat exchanger assembly 300, heat integrator 400, thermal conduit assembly 500 and gas turbine 700.

Preferably, thermal conduit assembly 500 defines first heat conducting passageway 520, wherein heat from recuperating heat exchanger assembly 300 is directed to a heat integrator 400, wherein heat integrator 400 is preferably a dual source heat dispenser. Thermal conduit assembly 500 defines a second heat-conducting passageway 540, wherein heat from thermal transfer assembly 100 is directed to heat integrator 400, thereby enabling a modular link to apparatus 10. Preferably, second heat conducting passageway 540 also directs heat from thermal transfer assembly 100 to an auxiliary heat conducting branch passageway 560.

Figure 2:
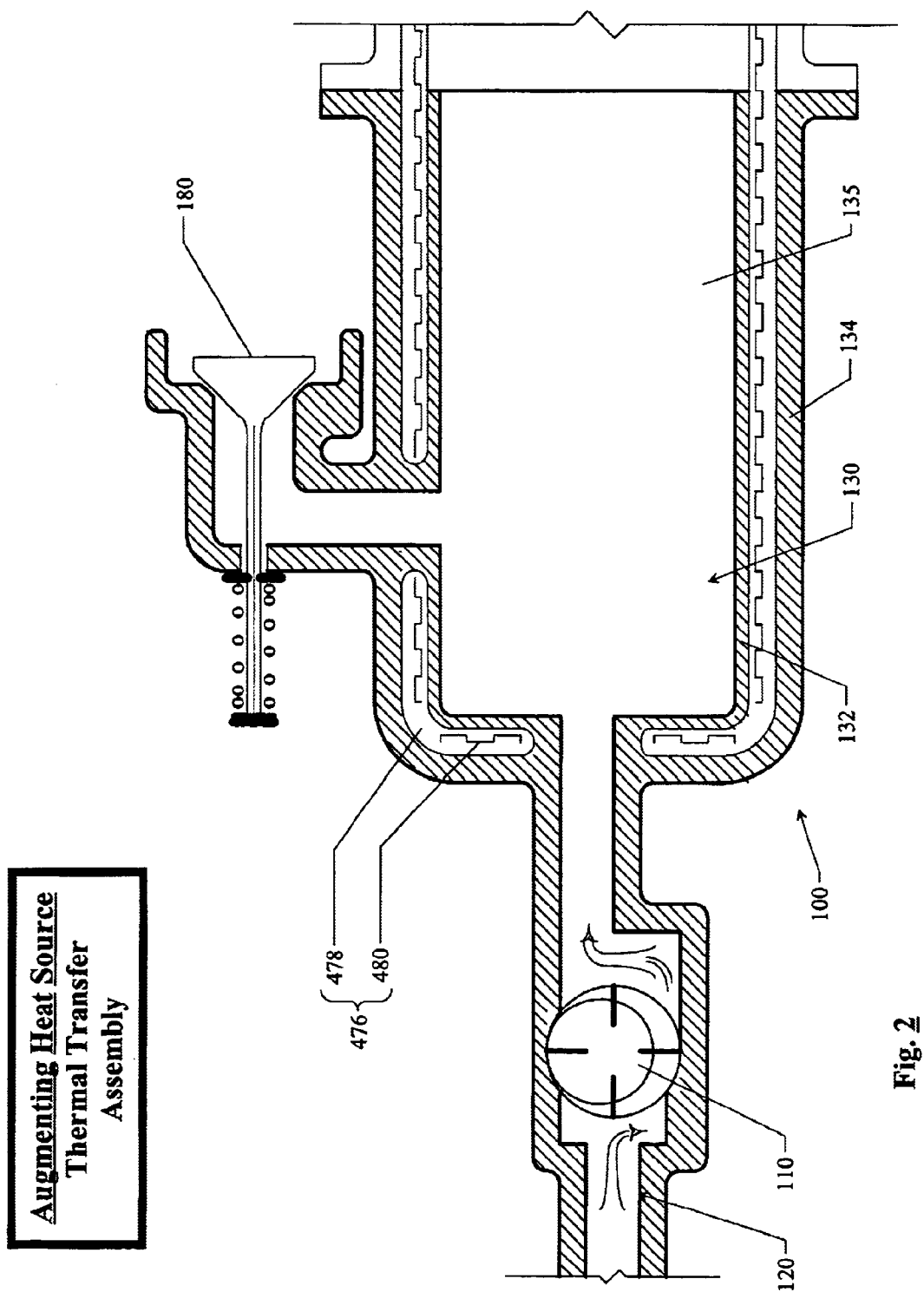
FIG. 2 is a sectional view taken along lines 2—2 of FIG. 1 of an integrated cycle gas turbine apparatus according to an embodiment of the present invention showing the thermal transfer assembly.
Figure 2A:
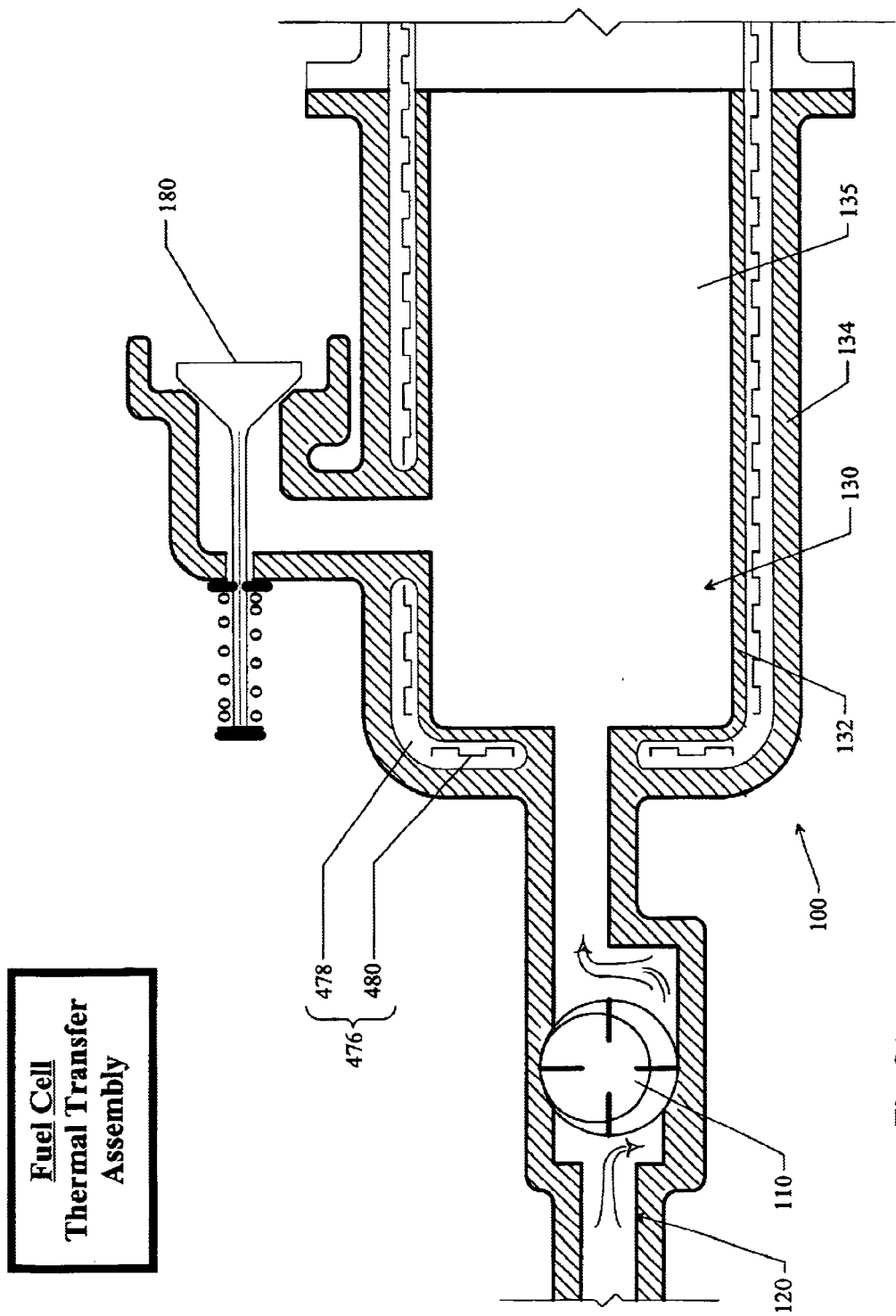
FIG. 2A is a sectional view taken along lines 2—2 of FIG. 1A of an integrated cycle fuel cell/gas turbine apparatus according to a preferred embodiment of the present invention showing the thermal transfer assembly.

Now referring more specifically to FIG. 2, thermal transfer assembly 100 receives heat emitted from the effluent of an augmenting heat source, wherein the heat is preferably in the form of high temperature gas. Thermal transfer assembly 100 generally comprises a gas-feed pump 110, a conduit 120, a gaseous reaction chamber 130, and a pressure control valve 180.

Specifically, gas-feed pump 110 is carried by conduit 120, wherein gas-feed pump 110 is preferably an eccentric vane pump, and wherein conduit 120 is in thermal communication with gaseous reaction chamber 130. Heat emitted from the augmenting heat source effluent enters conduit 120 and is pumped into gaseous reaction chamber 130 via gas-feed pump 110.

Gaseous reaction chamber 130 is preferably defined by inner containment vessel 132 and outer containment vessel 134 and is preferably cylindrically shaped, but may define other shapes such as, for exemplary purposes only, rectangular. Inner containment vessel 132 defines area 135, wherein area 135 holds the heat pumped by gas-feed pump 110. Inner containment vessel 132 and outer containment vessel 134 are separated by insulating medium 476, wherein insulating medium 476 is comprised preferably of vacuum convection barrier 478, preferably serving to reduce heat loss via convection, and reflective radiation barrier 480, preferably serving to contain and reflect back into gaseous reaction chamber 130 any heat that may be radiating from the contents of gaseous reaction chamber 130. Gaseous reaction chamber 130 further carries pressure control valve 180, wherein pressure control valve 180 preferably serves to regulate the amount of gaseous pressure in gaseous reaction chamber 130, releasing any excess pressure therefrom. Pressure control valve 180 extends through inner containment vessel 132 and outer containment vessel 134 of gaseous reaction chamber 130.

Now referring more specifically to FIG. 3, in thermal communication with gaseous reaction chamber 130 is gas-to-conductor assembly 200. Gas-to-conductor assembly 200 generally comprises first heat transfer medium 210, second heat transfer medium 230, third heat transfer medium 640, and containment vessel 270.

Specifically, first heat transfer medium 210 is preferably nickel-plated foam thermal absorption matrix. First heat transfer medium 210 preferably sits entirely in area 135 of gaseous reaction chamber 130 and preferably abuts inner containment vessel 132 of gaseous reaction chamber 130 of thermal transfer assembly 100. Second heat transfer medium 230 is preferably in continuous thermal communication with first heat transfer medium 210, and is preferably comprised of a sintered metallic-foam and thermal conductive conduit medium, wherein the thermal conductive conduit medium preferably comprises a sintered powdered metal. Although it is recognized in the art that powder metal is a preferred medium, other suitable media known within the art may also be used. To prevent the gas from gaseous reaction chamber 130 from entering area 275, vapor barrier 212 is formed between first heat transfer medium 210 and second heat transfer medium 230, wherein vapor barrier 212 serves preferably as an air-tight seal therebetween. Third heat transfer medium 640 is preferably in thermal communication with second heat transfer medium 230, and is preferably comprised of a sintered thermal conductive conduit medium, wherein the thermal conductive conduit medium preferably comprises a powdered metal. Although it is recognized in the art that powdered metal is a preferred medium, other suitable media known within the art may also be used.

Second and third heat transfer mediums 230 and 640, respectively, are contained preferably entirely within containment vessel 270. Containment vessel 270 generally 20 comprises inner containment vessel 272 and outer containment vessel 274. Inner containment vessel 272 defines area 275, wherein area 275 carries second and third heat transfer mediums 230 and 640, respectively, and wherein second and third heat transfer mediums 230 and 640, respectively, abut inner containment vessel 272. Inner containment vessel 272 and outer containment vessel 274 are separated by insulating medium 276, wherein insulating medium 276 is comprised preferably of a vacuum convection barrier, preferably serving to reduce heat loss via convection, and a reflective radiation barrier, preferably serving to contain and reflect back into second and third heat transfer mediums 230 and 640, respectively, any heat that may be radiating from the contents of second and third heat transfer mediums 230 and 640, respectively. Heat from gaseous reaction chamber 130 flows into first heat transfer medium 210, wherein the heat is then transferred to second heat transfer medium 230. The heat from second heat transfer medium 230 then flows into third heat transfer medium 640. Gases that may generate due to convection heat transfer and accumulate in containment vessel 270, can be evacuated via a negative pressure through interstitial vacuum ports 278 and 280 formed preferably in inner containment vessel 272, wherein interstitial vacuum ports 278 and 280 allow communication of the volume space of third heat transfer medium 640 with insulating medium 276.

Figure 3A:
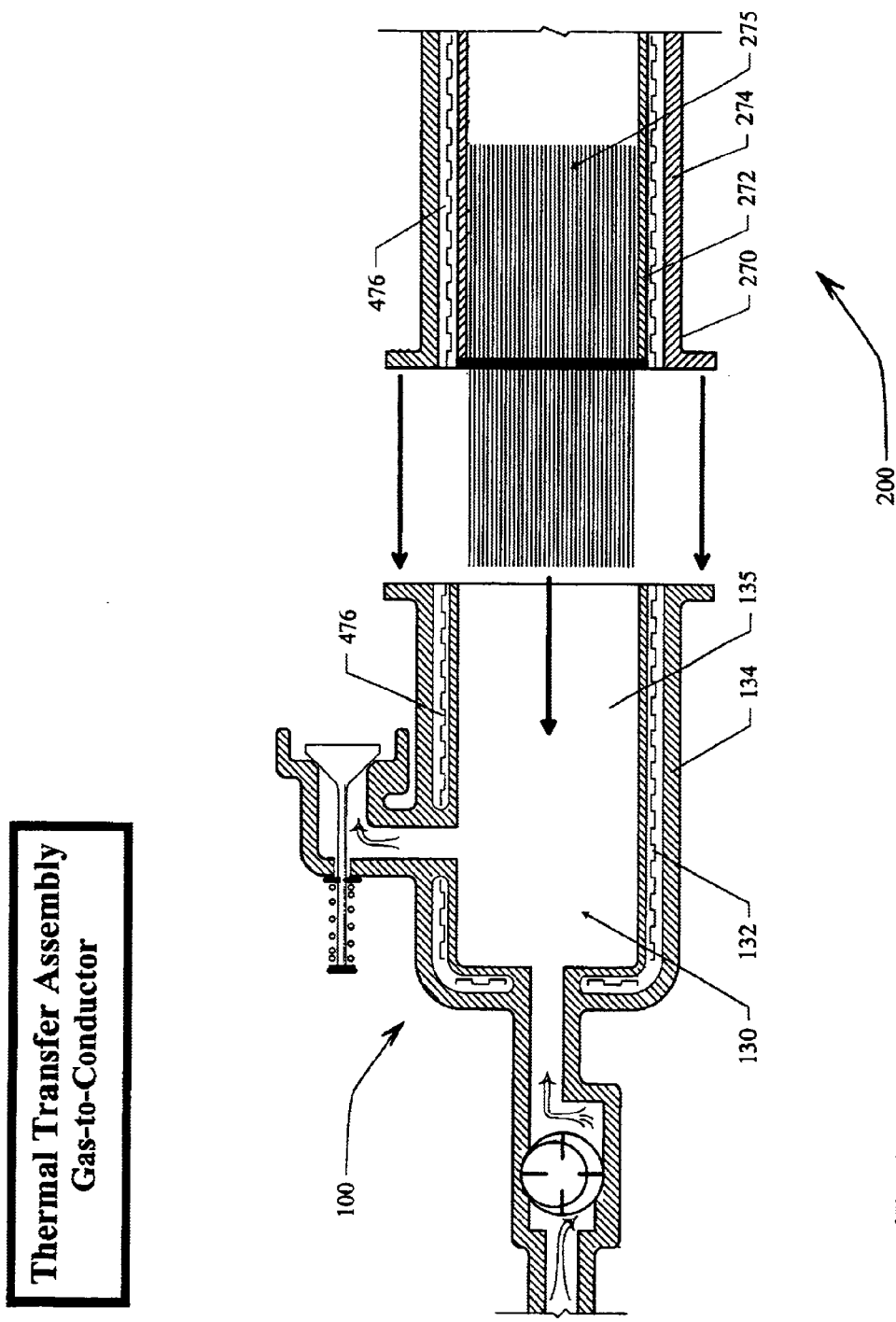
FIG. 3A is a sectional partially-exploded view taken along lines 3—3 of FIG. 1A of an integrated cycle fuel cell/gas turbine apparatus according to a preferred embodiment of the present invention showing the gas-to-conductor thermal transfer subassembly being inserted within the thermal transfer assembly.

Now referring more specifically to FIG. 3A, connection of gaseous reaction chamber 130 with gas-to-conductor assembly 200 results in thermal communication of inner containment vessel 132, outer containment vessel 134, insulating medium 476 and area 135 of gaseous reaction chamber 130 with inner containment vessel 272, outer containment vessel 274, insulating medium 476 and area 275, respectively, of containment vessel 270.

Figure 4:
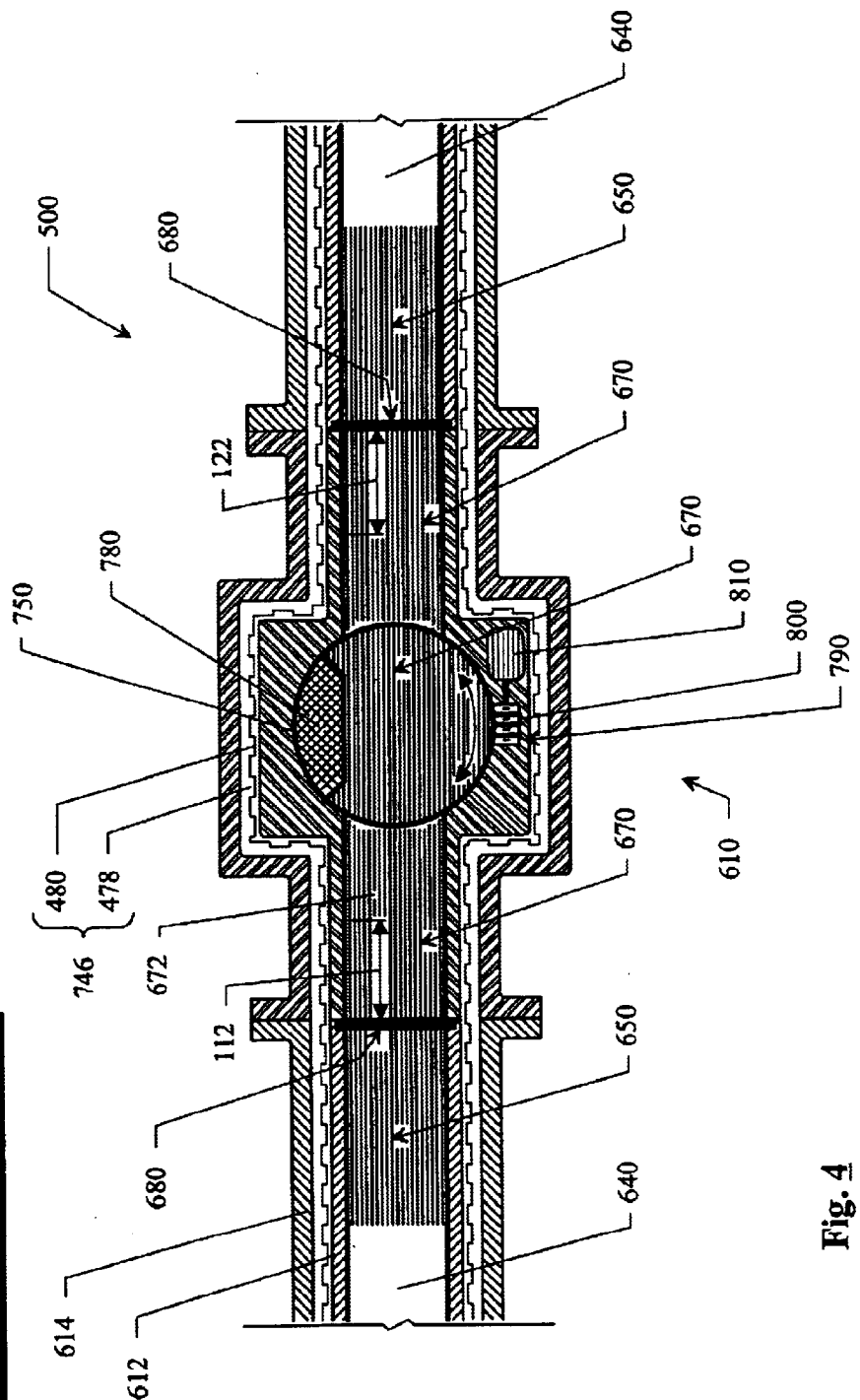
FIG. 4 is a sectional view taken along lines 4—4 of FIG. 1 of an integrated cycle fuel cell/gas turbine apparatus according to a preferred embodiment of the present invention showing the first branch isolator.
Figure 4A:
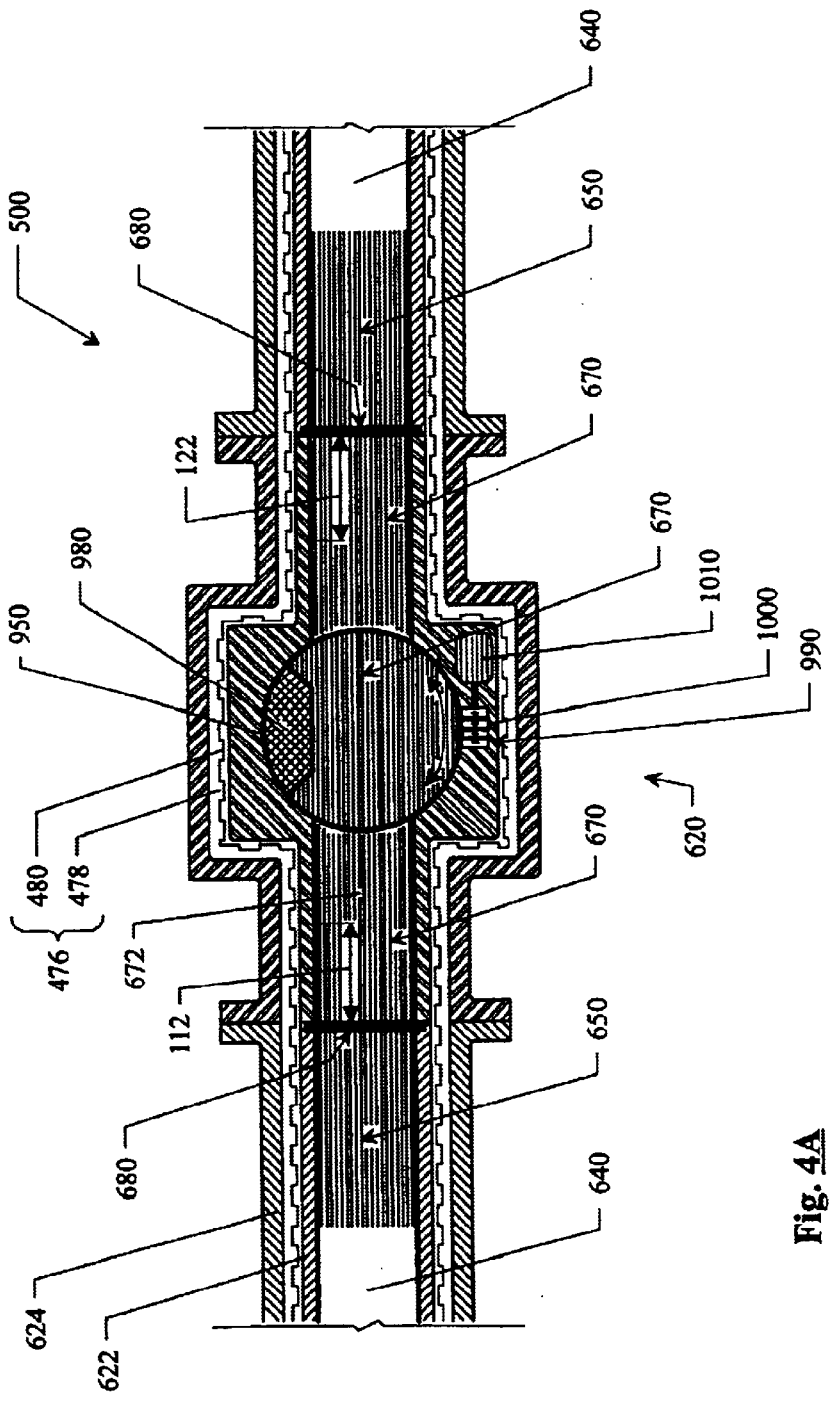
FIG. 4A is a sectional view taken along lines 4A—4A of FIG. 1 of an integrated cycle fuel cell/gas turbine apparatus according to an alternate embodiment of the present invention showing the second branch isolator.

Heat from third heat transfer medium 640 travels therethrough to second heat medium 650 of branch isolator assembly 610 and 620 (FIGS. 4 and 4A). Thermal conduit assembly 500 carries thermal gates 600. Thermal gates 600 comprise first branch isolator 610 and second branch isolator 620. First branch isolator 610 is positioned within auxiliary heat conducting branch passageway 560 of thermal conduit assembly 500, thereby enabling control of the transfer of energy from thermal transfer assembly 100 to auxiliary heat conducting branch passageway 560. Second branch isolator 620 is positioned within second heat conducting passageway 540, wherein the position thereof enables control of the transfer of energy from thermal transfer assembly 100 to heat integrator 400 and wherein the position thereof does not affect the transfer of energy from thermal transfer assembly 100 to auxiliary heat conducting branch passageway 560. Thus, first branch isolator 610 and second branch isolator 620 enable optimum energy management within apparatus 10 by enabling selected sub-system isolation.

Referring more specifically to FIG. 4 and FIG. 4A, preferably, first branch isolator 610 (FIG. 4) and second branch isolator 620 (FIG. 4A) are carried by thermal conduit assembly 500, wherein branch isolator 610 preferably comprises inner containment vessel 612 and outer containment vessel 614, and wherein branch isolator 620 preferably comprises inner containment vessel 622 and outer containment vessel 624. Abutting inner containment vessels 612 and 622 of branch isolators 610 and 620, respectively, is preferably first heat transfer medium 640, wherein first heat transfer medium 640 is preferably a sintered thermal conductive conduit medium, wherein the thermal conductive conduit medium preferably comprises a powdered metal. In thermal communication with first heat transfer medium 640 and abutting inner containment vessels 612 and 622 is second heat transfer medium 650, wherein second heat transfer medium 650 is preferably a sintered metallic-foam and thermal conductive conduit medium, wherein the thermal conductive conduit medium preferably comprises a powdered metal. In thermal communication with second heat transfer medium 650 is vapor barrier 680, wherein vapor barrier 680 is preferably a conductive vapor barrier with sintered metallic foam. In thermal communication with barrier 680 is third heat transfer medium 670, wherein third heat transfer medium 670 is a metallic foam conductor made preferably from copper metal and immersed in thermofluid complex 672. Third heat transfer medium 670 is preferably discontinuous at the radial boundary of rotating assembly 750 to allow rotating assembly 750 the freedom to rotate as described below.

Thermofluid complex 672 is preferably an ultra high temperature thermal fluid carrier having optimized thermal conductivity, thereby forming protective plating and acting as a lubricant, accommodating substantial assembly expansion and contraction issues generated by inherent heating and cooling cycles. Thermofluid complex 672 further preferably has a liquid metal medium such as, for exemplary purposes only, Gallium, Indium or Tin, or an appropriate combination thereof, and a free, powdered metal filler/conductor.

Continuing reference to FIG. 4 and FIG. 4A, immersion of third heat transfer medium 670 is in thermofluid complex 672, which forms transition zones 112 and 122. Transition zones 112 and 122 preferably transfer energy between upstream heat transfer medium 640 and thermofluid complex 672, and between thermofluid complex 672 and downstream heat transfer medium 640, respectively.

Inner containment vessel 612 and outer containment vessel 614 of branch isolator 610, as well as inner containment vessel 622 and outer containment vessel 624 of branch isolator 620, are separated by insulating medium 476, wherein insulating medium 476 is comprised preferably of a vacuum convection barrier, preferably serving to reduce heat loss via convection, and a reflective radiation barrier, preferably serving to contain and reflect back into thermal conduit assembly 500 any heat that may be radiating from the contents of thermal conduit assembly 500.

Preferably, each branch isolator 610 and 620 has rotating assembly 750 and 950, respectively, positioned therein, wherein rotating assembly 750 controls thermal flow from thermofluid complex 672, thereby preferably enabling active participation of transition zones 112 and 122 in the transfer of energy within the heat-sharing network of integrated cycle fuel cell/gas turbine apparatus 10. Preferably, rotating assembly 750 has insulator block 780 embedded therein. Insulator block 780 is preferably thermally resistant and is preferably ceramic. Ceramic is preferred wherein desired properties include hardness, refractoriness (high melting point) and low thermal and electrical conductivity, such that insulator block 780 acts as an insulator.

Rotation of insulator block 780 within rotating assembly 750 is actuated by mechanism assembly 790, wherein mechanism assembly 790 preferably comprises worm gear 800 in mechanical communication with motor 810. Mechanism assembly 790 enables activation of motor 810 to initiate rotation of insulator block 780 within rotating assembly 750 via worm gear 800, thereby closing branch isolator 610 and thus restricting energy flow through passageway 560.

Similarly, rotation of insulator block 980 within rotating assembly 950 of branch isolator 620 is actuated by mechanism assembly 990, wherein mechanism assembly 990 preferably comprises worm gear 1000 in mechanical communication with motor 1010. Mechanism assembly 990 enables activation of motor 1010 to initiate rotation of insulator block 980 within rotating assembly 950 via worm gear 1000, thereby closing branch isolator 620 and thus restricting energy flow therethrough.

Mechanism assembly 790 and 990 are preferably managed via a control system, wherein mechanism assembly 790 and 990 are automatically activated in response to preferably pre-established conditions, such as those relating to decreased power demands wherein only auxiliary equipment is utilizing power and/or in response to emergency conditions.

Figure 5:
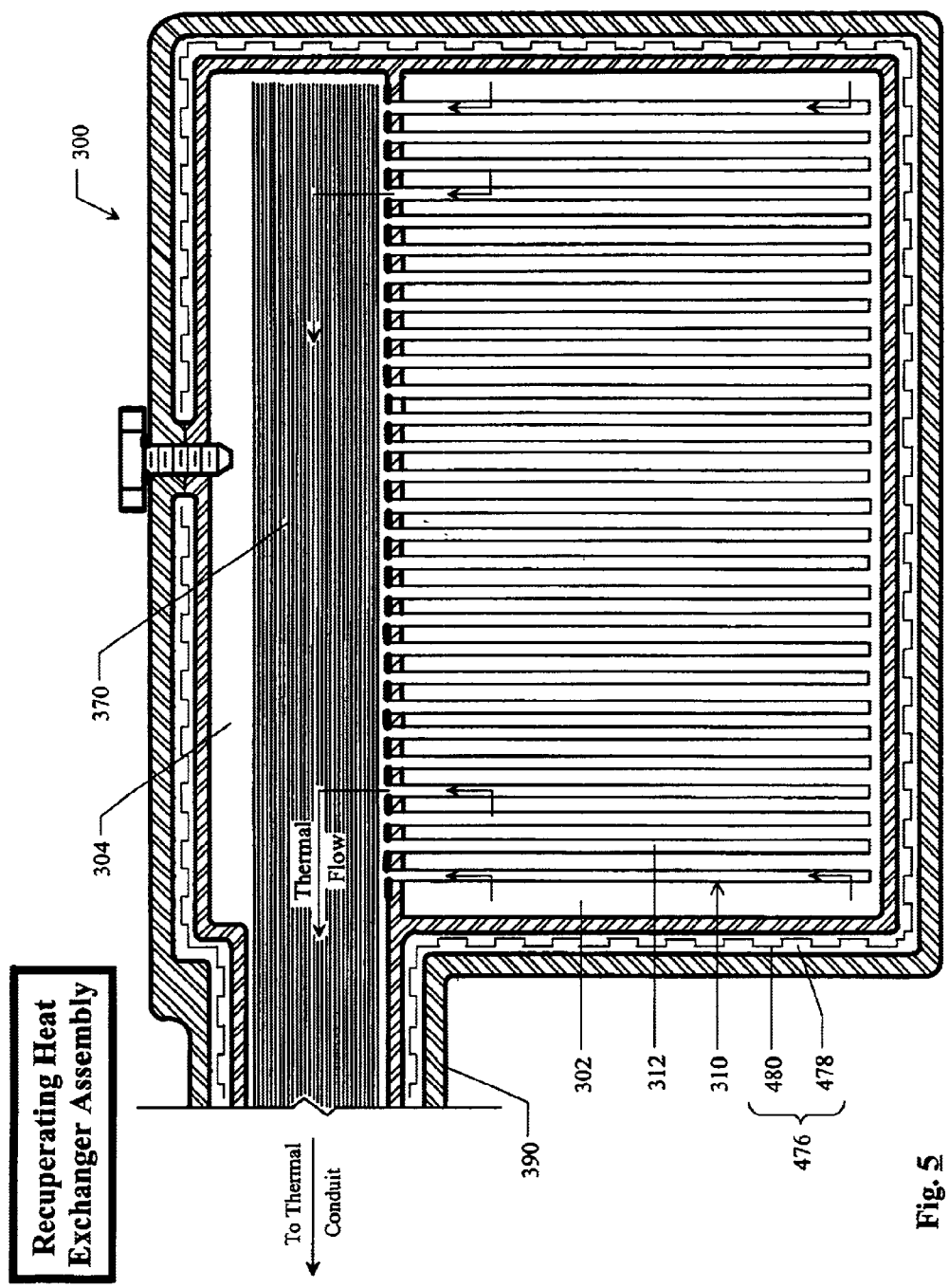
FIG. 5 is a sectional view taken along lines 5—5 of FIG. 1 of an integrated cycle fuel cell/gas turbine apparatus according to a preferred embodiment of the present invention showing the recuperating heat exchanger assembly.
Figures 6, 7:
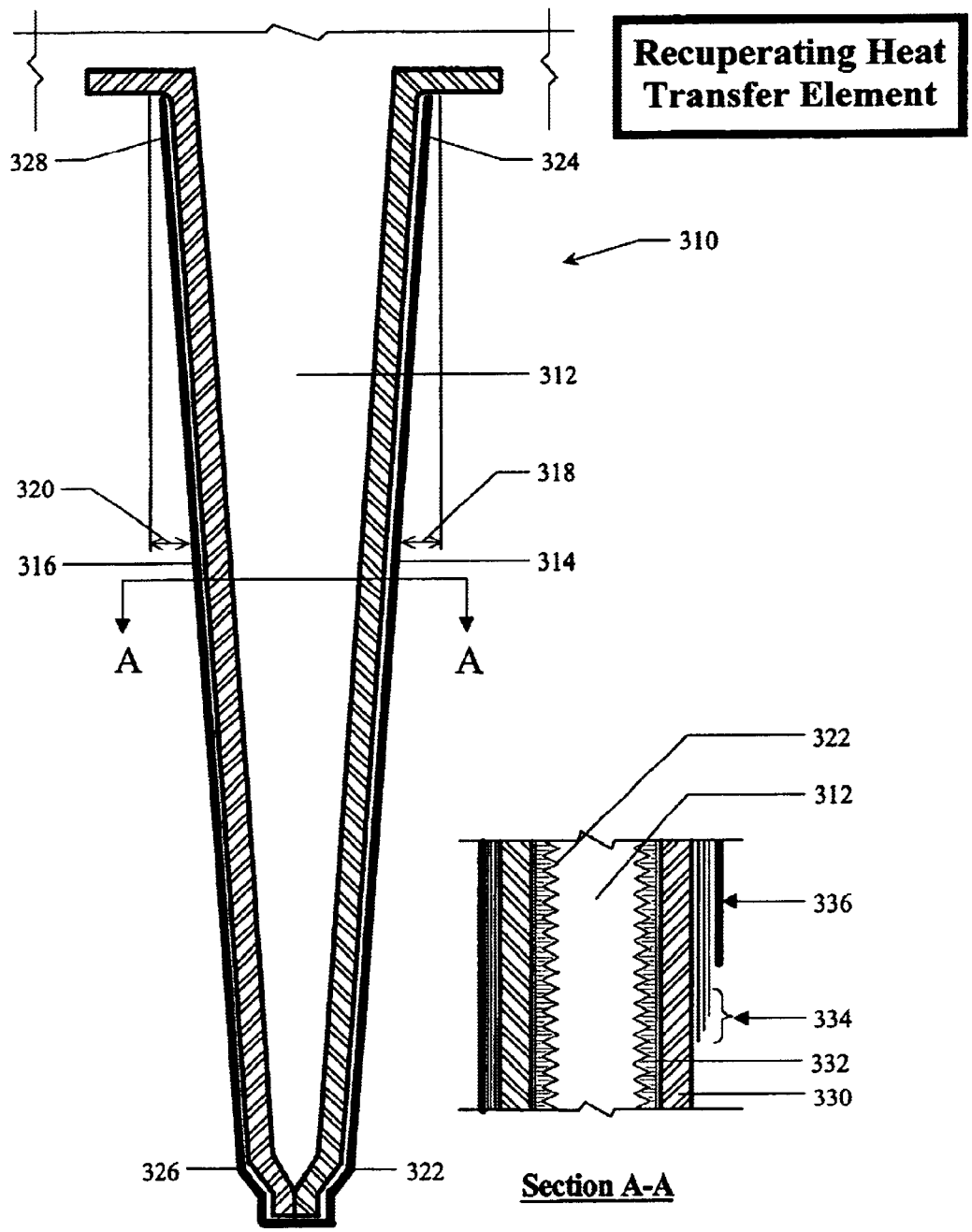
FIG. 6 is a sectional view taken along lines 6—6 of FIG. 5 of an integrated cycle fuel cell/gas turbine apparatus according to a preferred embodiment of the present invention showing the recuperating heat transfer element.
FIG. 7 is a sectional view taken along lines 7—7 of FIG. 6 of an integrated cycle fuel cell/gas turbine apparatus according to a preferred embodiment of the present invention showing the recuperating heat transfer element.

Referring now to FIGS. 5–7, recuperating heat exchanger assembly 300 is preferably formed from the previously discussed dewar system, wherein insulating medium 276 is comprised preferably of a vacuum convection barrier, preferably serving to reduce heat loss via convection, and a reflective radiation barrier, preferably serving to contain and reflect heat back into recuperating heat exchanger assembly 300. Recuperating heat exchanger assembly 300 is generally defined by heat exchange region 302 and expansion region 304. Housed within heat exchange region 302 are a plurality of heat transfer elements 310, wherein heat transfer elements 310 are preferably elongated and spaced apart to allow hot exhaust gas from the gas turbine 700 to flow thereacross, thereby transferring heat from the hot gas turbine 700 exhaust to each of the heat transfer elements 310.

Contained within each of the heat transfer elements 310 is preferably thermofluid 312 such as, for exemplary purposes only, liquid metal or a composite carbon graphite media. Thermofluid 312 is further contained within expansion region 304 and passageway 390. Additionally, heat transfer medium 370 is contained within expansion region 304 and passageway 390, wherein heat transfer medium 370 is preferably a metallic foam conductor made preferably from copper metal preferably immersed within a thermofluid complex 312.

Thermofluid complex 312 is preferably an ultra high temperature thermal fluid carrier having optimized thermal conductivity, thereby forming protective plating and acting as a lubricant, accommodating substantial assembly expansion and contraction issues generated by inherent heating and cooling cycles. Thermofluid complex 312 further preferably has a liquid metal medium, such as, for exemplary purposes only, Gallium, Indium or Tin, or an appropriate combination thereof, and a free, powdered metal filler/conductor.

A temperature differential exists between heat integrator 400 and heat transfer elements 310 such that heat transferred from the hot gas turbine 700 exhaust travels to the heat integrator 400 via heat transfer elements 310, expansion region 304 and passageway 390.

Now referring more specifically to FIGS. 6–7, each heat transfer element 310 is preferably formed such that side wall assemblies 314 and 316 have a draft angle 318 and 320, respectively. More specifically, lower portions 322 and 326 of side wall assemblies 314 and 316, respectively, are preferably separated by less distance than upper portions 324 and 328 of side wall assemblies 314 and 316, respectively. As a result, heat transfer elements 310 can accommodate thermal/mechanical expansion and contraction during use, thereby allowing free vertical movement of thermofluid 312.

Side wall assemblies 314 and 316 are designed to facilitate the transfer of heat in one direction. More specifically, heat is allowed to enter each heat transfer element 310 through side wall assemblies 314 and 316 but is blocked from exiting side wall assemblies 314 and 316. Consequently, due to the thermal potential existing between heat transfer elements 310 and heat integrator 400, heat flow travels from heat transfer elements 310 to heat integrator 400.

Side walls 314 and 316 preferably comprise outer thermal absorption layer 336, abutting interference-film complex 334, followed by a layer of preferably nickel-chrome 330 and an inner layer of preferably copper backing clad 332, wherein the copper backing clad 332 preferably has inner surface 340 that is preferably profiled so as to increase the surface area and thereby increase the heat transfer rate between copper backing clad 332 and thermofluid 312. Thermal absorption layer 336 serves to facilitate the absorption of heat thereinto and interference-film complex 334 acts as an interference on any heat trying to escape therefrom. Copper backing clad 332 also serves as a conductive element having a high surface area contact with thermofluid 312. Structural support for each heat transfer element 310 is preferably provided by nickel-chrome layer 330.

Figure 8:
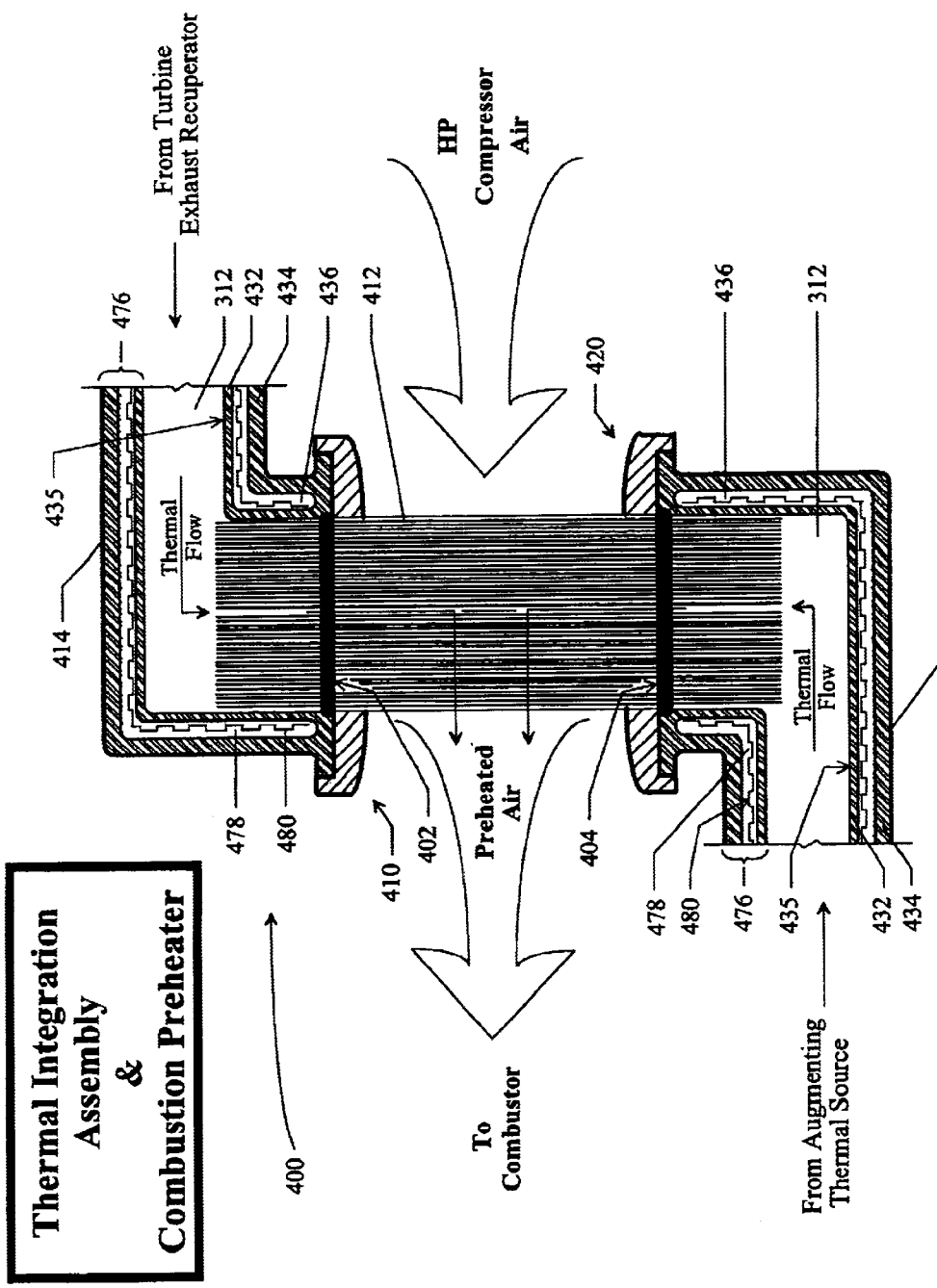
FIG. 8 is a sectional view taken along lines 9—9 of FIG. 1 of an integrated cycle fuel cell/gas turbine apparatus according to a preferred embodiment of the present invention showing the heat integrator.
Figure 9:
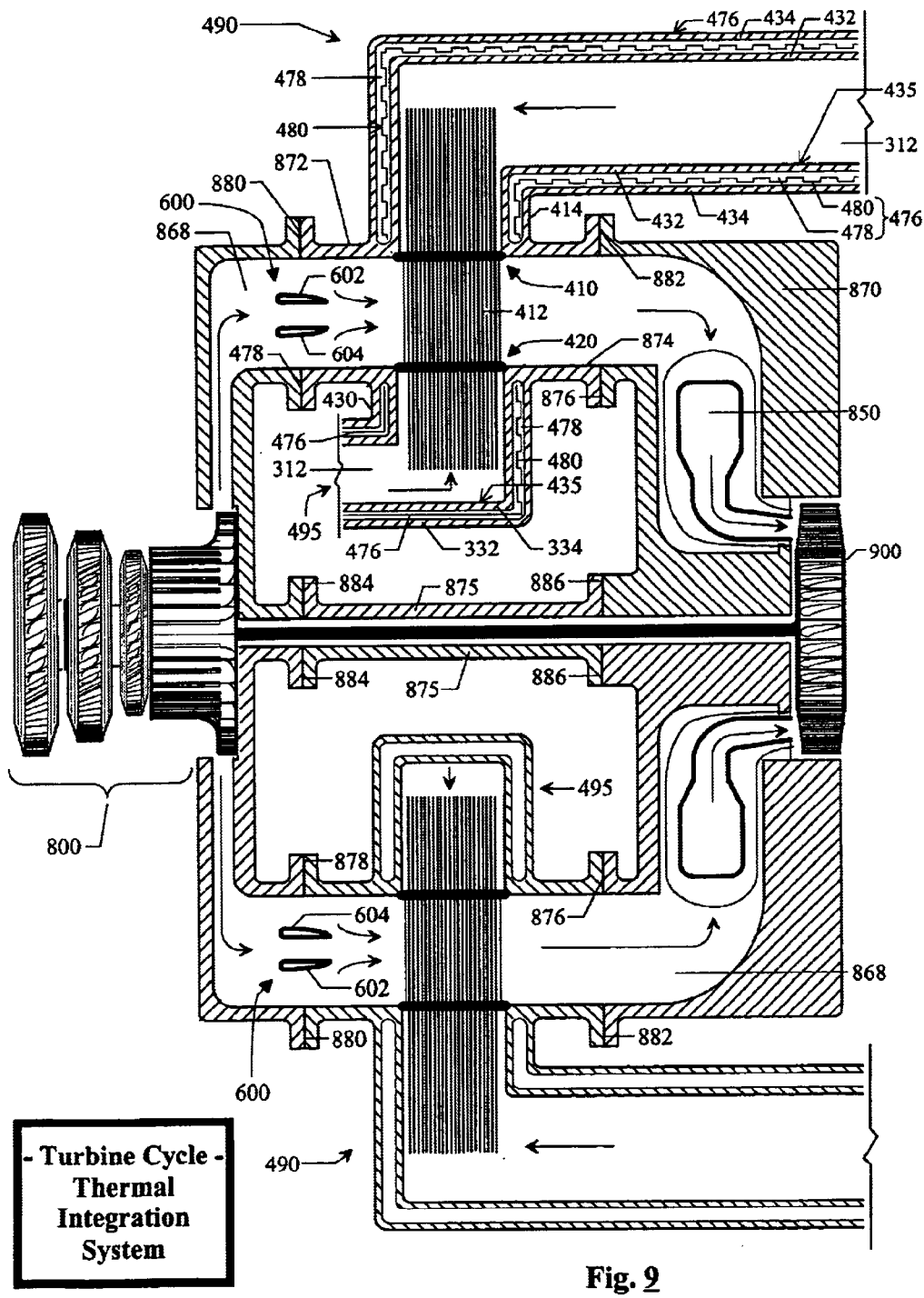
FIG. 9 is a sectional view taken along lines 9—9 of FIG. 1 of an integrated cycle fuel cell/gas turbine apparatus according to a preferred embodiment of the present invention showing the gas turbine along with the heat integrator.

Referring now to FIGS. 8–9, heat integrator 400 serves to integrate thermal flow from heat exchanger assembly 300 and thermal flow from the augmenting heat source A with the high pressure compressor air flow. Heat integrator 400 is defined by first vapor barrier 402, second vapor barrier 404, first exit port 410 and second exit port 420, wherein first exit port 410 and second exit port 420 are preferably directly opposing each other and are preferably separated, and wherein first exit port 410 and second exit port 420 are directed toward each other. Positioned between and partially into first exit port 410 and second exit port 420 is heat transfer medium 412. Heat transfer medium 412 is preferably a metal foam thermal conductive matrix having a pores-per-inch open-cell structure of approximately eighty; however, foams having various pores per inch may be utilized in alternate embodiments. It is also contemplated that other heat transfer media such as, for exemplary purposes only, fin-type may be used. Heat transfer medium 412 is preferably continuous; extending from point of inception within first neck 414 to point of inception within second neck 430. First and second vapor barriers 402, 404 are formed at first exit port 410 and second exit port 420, respectively, to prevent thermal fluid medium 312 from exiting the respective conduits. As such, only heat is transferred across first and second vapor barriers 402, 404 and into the path of the high pressure compressor air.

Now referring more specifically to FIG. 9, first leg 490 of heat integrator 400 preferably comprises first neck 414 and first exit port 410, wherein first leg 490 leads to and is in thermal communication with heat exchanger assembly 300. Second leg 490 of heat integrator 400 preferably comprises second neck 430 and second exit port 420, wherein second leg 490 leads to and is in thermal communication with the augmenting heat source A. First neck 414 and second neck 430 of first exit port 410 and second exit port 420, respectively, are preferably defined by inner containment vessel 432 and outer containment vessel 434. Inner containment vessel 432 defines area 435, wherein area 435 contains thermofluid 312 such as, for exemplary purposes only, a filled liquid-metal composition containing carbon graphite or conductive metallic media. Inner containment vessel 432 and outer containment vessel 434 are separated by an insulating medium 476. Insulating medium 476 preferably comprises the previously discussed dewar system, wherein insulating medium 476 is comprised preferably of a vacuum convection barrier 478, preferably serving to reduce heat loss via convection, and a reflective radiation barrier 480, preferably serving to contain and reflect heat back into first neck 414 and second neck 430.

Due to the thermal potential difference between the high pressure compressor air and the heat exchanger assembly 300 and the augmenting heat source A, thermal flow from heat exchanger assembly 300 and the augmenting heat source A is transferred to the opposing ends of heat transfer medium 412 and toward its center, wherein the high pressure compressor air flows thereover. Thermal-energy transfer performance from transfer medium 412 is further enhanced and accelerated as a consequence of the elevated pressure density of the compressor-discharge air flow. The thermal energy is thereby transferred to the air flow and thus serves to preheat the air flow entering the combustor. By preheating the air flow into the combustor, the overall thermal efficiency of the system is increased.

As further shown in FIG. 9, heat integrator 400 is preferably annular shaped, wherein both first leg 490 to the heat exchanger assembly 300 and second leg 495 to the augmenting heat source A are attached to the gas turbine casing 870 annularly. More specifically, gas turbine casing 870 preferably comprises outer annulus 872, intermediate annulus 874 and inner annulus 875. First leg 490 is preferably attached to the periphery of outer annulus 872 and is in thermal communication with annular channel 868 of gas turbine casing 870. Second leg 495 is preferably attached to the periphery of intermediate annulus 874 and is in thermal communication with annular channel 868 of gas turbine casing 870. First exit port 410 of first leg 490 is preferably positioned directly across and at the same longitudinal position as second exit port 420 of second leg 495.

To assist in maintaining the maximum potential thermal drop at the center between first exit port 410 and second exit port 420, flow control airfoils 600 are positioned within channel 868 proximal to transfer medium 412. Flow control airfoils 600 aerodynamically direct airflow from the high-pressure compressor 800 toward the approximate center of transfer medium 412, thereby maintaining a greater thermal difference at the approximate radial center of channel 868. As the power demand changes during operation, the thermal output of the recuperator will vary proportionally with the power demand and preferably disportionately with external augmenting heat source A and results in less thermal energy being channeled through first exit port 410. Consequently, a thermal shift would result radially toward exit port 410; flow control airfoils 600 ensure that this shift is minimized.

Although it is preferred that thermal integration system 400 operate statically, in an alternate embodiment thermofluid 312 could be circulated via a pumping mechanism to alter the overall thermal transfer characteristics. Further, as a result of the operating environment, the fluid component will remain a low-melt metal alloy.

Thermofluid 312 preferable demonstrates maximum thermal conductivity. The solid conductive constituent of the thermofluid 312 serves as the controlling factor in both function and cost of the thermofluid 312 formulation. Although copper is the preferred metal constituent of thermofluid 312, in an alternate embodiment, it is contemplated that other materials can be used, such as carbon, examples of which can include carbon types IIA or TPG; certain ceramic compounds; or silver.

It is further contemplated in an alternate embodiment that portions of conduit assembly 500 could be solid core formed from solid metal, preferably copper; sintered metal powder or particulates; sintered ceramic alloys; or structured carbon applications, such as carbon-graphite composite.

Although heat transfer medium 412 is preferably an expanded copper metal foam matrix, in an alternate embodiment, it is recognized that other material such as silver, aluminum or ceramic structure can be used in place of the copper metal.

In another alternate embodiment, exit ports 410 and 420 could define an inner-surface geometry profiled so as to alter any airflow-induced pressure drop across the air-preheat, thermal transfer zone 412 and alter the thermal transfer characteristics appropriate for disparate applications.

Although insulating medium 476 preferably comprises vacuum convection barrier 478 and reflective radiation barrier 480, it is recognized in an alternate embodiment that other mediums can be used, such as new rigid-foam insulators or other materials and processes, wherein the overall thermal-isolation function is preferably maintained regardless of the evolving materials and processes.

Thermal integration system 400 can be liberally fabricated or customized to fit any desired application, including non-turbine heat transfer facilities/requirements.

Although it is preferred that an augmenting, independent heat source be available, it is contemplated in an alternate embodiment that in the absence of such an augmenting, independent heat source, second neck 430 could be routinely coupled to first neck 414, using branch isolator 610 in order to maximize thermal-flow capacity from recuperator 300.

Although recuperating heat transfer elements 3 10 are preferably housed within heat exchange region 302, it is recognized in an alternate embodiment that heat transfer elements 310 can be formed as a free-standing assembly or as two opposing plates, wherein either case, thermofluid 312 is the preferred heat-transport agent. Furthermore, although thermofluid 312 is the preferred heat-transport agent in heat transfer elements 310, it is contemplated in an alternate embodiment that air could be used as the heat transfer fluid.

Although it is preferred that heat transfer elements 310 comprise nickel-chromium alloy plating, it is recognized in an alternate embodiment that ceramic composites such as silicon carbide CFCC (Continuous Fiber-reinforced Ceramic Composite) can be utilized in place of the nickel-chromium alloy plating.

In another alternate embodiment, interference-film complex 334 and thermal absorption layer 336 could comprise a mandatory thermal diode heat driver.

Although it is preferred that heat transfer elements 310 are elongated and spaced apart to allow hot exhaust gas from the gas turbine 700 to flow thereacross, it is recognized in an alternate embodiment that heat transfer elements 310 can be positioned vertically, horizontally, planar or geometrically so as to conform to the optimum gas-path flow requirements of the turbine exhaust function and/or configured for maximum energy recovery. Moreover, energy collection and transfer volume systems of recuperating heat exchanger assembly 300 can be located on the top, bottom and/or sides of heat transfer elements 310.

In still another alternate embodiment, the recuperating heat exchanger assembly 300 can be outfitted with any combination of thermal transport passageways 390 so as to accommodate the specific application.

Although the preferred physical positioning of rotating, thermal-transmission "shuttering" function 750 is within branch isolators 610 and 620, it is recognized in an alternate embodiment that any number of physical layouts of rotating, thermal-transmission "shuttering" function 750 may be implemented as long as the conduction of thermal energy is preferably interruptible by the controlled insertion of an insulating obstruction. Specifically, when in the conductive mode (insulating obstruction removed), maximum system thermal conduction is preferably allowed, and when in the non-conductive mode (insulating obstruction actively employed), maximum system thermal isolation is preferably imposed.

Although thermal "shutter" actuating mechanism 790 preferably comprises worm gear 800 in mechanical communication with motor 810, it is recognized that thermal "shutter" actuating mechanism 790 may take any form.

It is contemplated that the conduit may be formed from a flexible, semi-flexible or rigid material.

In yet another alternate embodiment, the branch isolator mechanism may be altered, using multiple branch adaptors to essentially create a network that functions collectively as a thermal-system routing and management director.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A power system, comprising:
   an auxiliary power source;
   a gas turbine;
   a recuperator; and
   a heat integrator, wherein said auxiliary power source is in thermal communication with said heat integrator, wherein said recuperator is in thermal communication with said heat integrator, and wherein said heat integrator is in thermal communication with said gas turbine.

2. A method of generating power, comprising the steps of:
   a. thermally connecting an auxiliary power source to a heat integrator;
   b. thermally coupling a recuperator to said heat integrator; and
   c. thermally coupling said heat integrator to a gas turbine.

3. An integrated-cycle power system comprising:
   a gas turbine;
   a thermal transfer assembly, said thermal transfer assembly receiving an augmenting heat source effluent and said thermal transfer assembly transferring energy from said effluent to a conductive medium;
   a recuperating heat exchanger assembly, said recuperating heat exchanger assembly receiving exhaust heat from said gas turbine and transferring energy from the exhaust heat to a heat integrator;
   a heat integrator, said heat integrator receiving said energy from said augmenting heat source, said heat integrator receiving energy from said recuperating heat exchanger assembly, said heat integrator combining the energy from said augmenting heat source and the energy from said recuperating heat exchanger assembly, and said heat integrator introducing said combined energy into a combustion chamber of said gas turbine; and
   a thermal conduit assembly, said thermal conduit assembly carrying said conductive medium, said thermal conduit assembly directing energy from said recuperating heat exchanger assembly to said heat integrator and said thermal conduit assembly directing energy from said thermal transfer assembly to said heat integrator.

4. The integrated-cycle power system of claim 3, wherein the augmenting heat source is a fuel cell and the effluent is a high temperature gas.

5. The integrated-cycle power system of claim 3, wherein said thermal conduit assembly has a first heat conducting passageway, said first heat conducting passageway directing energy from said recuperating heat exchanger assembly to said heat integrator, and wherein said thermal conduit assembly has a second heat conducting passageway, said second heat conducting passageway directing heat from said thermal transfer assembly to said heat integrator.

6. The integrated-cycle power system of claim 5, wherein said second heat conducting passageway also directing heat from said thermal transfer assembly to an auxiliary heat conducting branch passageway.

7. The integrated-cycle power system of claim 3, wherein said heat integrator is a dual source heat dispenser.

8. The integrated-cycle power system of claim 6, wherein said thermal transfer assembly comprises a gas-feed pump, a gaseous reaction chamber, a conduit in thermal communication with said gaseous reaction chamber, and a pressure control valve, said conduit receiving heat from said augmenting heat source effluent, said gas-feed pump pumping said heat into said gaseous reaction chamber and said pressure control valve carried by said gaseous reaction chamber.

9. The integrated-cycle power system of claim 8, wherein said gas-feed pump is an eccentric vane pump carried by said conduit.

10. The integrated-cycle power system of claim 8, wherein said gaseous reaction chamber has an inner containment vessel and an outer containment vessel, wherein said inner containment vessel and said outer containment vessel are separated by an insulating medium, wherein said inner containment vessel receives heat via said thermal transfer assembly, and wherein said pressure control valve extends through said inner containment vessel and said outer containment vessel.

11. The integrated-cycle power system of claim 10, wherein said insulating medium is a vacuum convection barrier and a reflective radiation barrier.

12. The integrated-cycle power system of claim 10, further comprising a gas-to-conductor assembly, said gas-to-conductor assembly comprising a first heat transfer medium, a second heat transfer medium, a third heat transfer medium and a containment vessel, wherein said gas-to-conductor assembly is in thermal communication with said gaseous reaction chamber and wherein said first heat transfer medium and said second heat transfer medium have a vapor barrier therebetween.

13. The integrated-cycle power system of claim 12, wherein said first heat transfer medium is a nickel-plated foam thermal absorption matrix carried within said gaseous reaction chamber of said thermal transfer assembly, wherein said second heat transfer medium is a sintered metallic-foam and thermal conductive conduit medium in thermal communication with said first heat transfer medium, wherein said third heat transfer medium is a sintered thermal conductive conduit medium in thermal communication with said second heat transfer medium, and wherein said second heat transfer medium and said third heat transfer medium are carried within said containment vessel.

14. The integrated-cycle power system of claim 13, wherein said containment vessel has an inner containment vessel and an outer containment vessel, wherein said inner containment vessel and said outer containment vessel are separated by an insulating medium, wherein said first heat transfer medium receives heat from said gaseous reaction chamber, wherein said heat is transferred from said first heat transfer medium to said second heat transfer medium, and wherein said heat is transferred from said second heat transfer medium to said third heat transfer medium.

15. The integrated-cycle power system of claim 14, wherein said insulating medium is a vacuum convection barrier and a reflective radiation barrier, and wherein a plurality of interstitial vacuum ports are carried by said inner containment vessel.

16. The integrated-cycle power system of claim 15, wherein said inner containment vessel, said outer containment vessel, and said insulating medium of said gaseous reaction chamber are in thermal communication with said inner containment vessel, said outer containment vessel, and said insulating medium of said containment vessel, and wherein said thermal conduit assembly carries a plurality of thermal gates.

17. The integrated-cycle power system of claim 16, wherein said plurality of thermal gates is a first branch isolator and a second branch isolator, said first branch isolator carried by said auxiliary heat conducting branch passageway and said second branch isolator carried by said second heat conducting passageway, and said first branch isolator and said second branch isolator each having an inner containment vessel and an outer containment vessel, each said inner containment vessel and outer containment vessel separated by an insulating medium, wherein a first heat transfer medium abuts said inner containment vessel of said first branch isolator and said second branch isolator, wherein a second heat transfer medium is in thermal communication with said first heat transfer medium, wherein a vapor barrier is in thermal communication with said second heat transfer medium, and wherein a third heat transfer medium is in thermal communication with said vapor barrier, said third heat transfer medium discontinuous at a radial boundary of a rotating assembly.

18. The integrated-cycle power system of claim 17, wherein said insulating medium is a vacuum convection barrier and a reflective radiation barrier, wherein said first heat transfer medium is a sintered thermal conductive conduit medium and said thermal conductive conduit comprises a powdered metal, wherein said second heat transfer medium is a sintered metallic-foam and thermal conductive conduit medium and said thermal conductive conduit medium comprises a powdered metal, wherein said vapor barrier is a conductive vapor barrier with sintered metallic foam, wherein said third heat transfer medium is a metallic foam conductor and said metallic foam conductor comprises copper metal immersed in a thermofluid complex, and wherein a plurality of transition zones transfer energy via said thermofluid complex.

19. The integrated-cycle power system of claim 18, wherein said thermofluid complex is a liquid metal medium and a free, powdered metal.

20. The integrated-cycle power system of claim 17, wherein said rotating assembly of said first branch isolator and said rotating assembly of said second branch isolator each rotatably carries an insulator block, each said insulator block actuated by a mechanism assembly.

21. The integrated-cycle power system of claim 20, wherein said insulator block is ceramic, wherein said mechanism assembly comprises a worm gear in mechanical communication with a motor, and wherein said mechanism assembly is controlled via a conditionally responsive system.

22. The integrated-cycle power system of claim 13, wherein said thermal conductive conduit medium of said second heat transfer medium is a sintered powder metal and wherein said thermal conductive conduit medium of said third transfer medium is a powdered metal.

23. The integrated-cycle power system of claim 3, wherein said recuperating heat exchanger assembly comprises a dewar system having an insulating vacuum convection barrier and a reflective radiation barrier, wherein said recuperating heat exchange assembly has a heat exchange region and an expansion region, wherein a plurality of heat transfer elements are carried within said heat exchange region, each said heat transfer element of said plurality of heat transfer elements comprising thermofluid, and wherein said expansion region comprises thermofluid and a heat transfer medium.

24. The integrated-cycle power system of claim 23, wherein each said heat transfer element comprises a plurality of side wall assemblies, wherein each said side wall assembly of said plurality of side wall assemblies has a lower portion and an upper portion, wherein said lower portions are separated by less distance than said upper portions, wherein a draft angle is defined thereby, and wherein said side wall assemblies transfer heat in one direction.

25. The integrated-cycle power system of claim 24, wherein said side wall assemblies comprise an outer thermal absorption layer, an abutting interference-film complex, a layer of nickel-chrome and an inner layer of copper backing clad, wherein said copper backing clad has a profiled inner surface.

26. The integrated-cycle power system of claim 3, wherein said heat integrator comprises a first vapor barrier, a second vapor barrier, a first exit port, a second exit port, and a heat transfer medium, wherein said heat integrator comprises a first leg having a first neck and a first exit port, said first leg in thermal communication with said heat exchanger assembly and annularly carried by said gas turbine, wherein said heat integrator comprises a second leg having a second neck and a second exit port, said second leg in thermal communication with the augmenting heat source and annularly carried by said gas turbine, and wherein said first neck and said second neck comprise an inner containment vessel and an outer containment vessel with an insulating medium therebetween, and said inner containment vessel carries thermofluid.

27. The integrated-cycle power system of claim 26, wherein said gas turbine has a casing, said casing comprising an outer annulus, an intermediate annulus and an inner annulus, wherein said first leg is carried by said outer annulus and said second leg is carried by said intermediate annulus, and wherein a plurality of flow control airfoils are carried by said heat integrator.

28. The integrated-cycle power system of claim 26, wherein said heat transfer medium is a metal foam thermal conductive matrix.

* * * * *